(12) United States Patent
Hutter et al.

(10) Patent No.: US 11,104,519 B2
(45) Date of Patent: Aug. 31, 2021

(54) DEVICE FOR CONVEYING VIA SELF-CONTAINED CARRIAGE

(71) Applicant: SIDEL ENGINEERING & CONVEYING SOLUTIONS, Reichstett (FR)

(72) Inventors: Patrick Hutter, Reichstett (FR); Jean-Claude Waeldin, Reichstett (FR)

(73) Assignee: SIDEL ENGINEERING & CONVEYING SOLUTIONS, Reichstett (FR)

( * ) Notice: Subject to any disclaimer, the term of this patent is extended or adjusted under 35 U.S.C. 154(b) by 0 days.

(21) Appl. No.: 15/563,077

(22) PCT Filed: Apr. 1, 2016

(86) PCT No.: PCT/FR2016/050743
§ 371 (c)(1),
(2) Date: Sep. 29, 2017

(87) PCT Pub. No.: WO2016/156754
PCT Pub. Date: Oct. 6, 2016

(65) Prior Publication Data
US 2018/0086566 A1    Mar. 29, 2018

(30) Foreign Application Priority Data

Apr. 2, 2015 (FR) ...................... 15 52867

(51) Int. Cl.
*B65G 37/02* (2006.01)
*G05D 1/02* (2020.01)
(Continued)

(52) U.S. Cl.
CPC ............ *B65G 37/02* (2013.01); *B23P 21/004* (2013.01); *G05D 1/0291* (2013.01); *B65B 3/00* (2013.01);
(Continued)

(58) Field of Classification Search
CPC ................. B23P 21/004; G05D 2201/0216
See application file for complete search history.

(56) References Cited

U.S. PATENT DOCUMENTS

| 4,669,047 A | 5/1987 | Chucta |
| 4,894,908 A * | 1/1990 | Haba, Jr. ............... B23P 21/004 29/711 |

(Continued)

FOREIGN PATENT DOCUMENTS

| EP | 1 497 208 B1 | 9/2006 |
| EP | 1 988 038 A2 | 11/2008 |

(Continued)

OTHER PUBLICATIONS

European Opposition to EP 3075685 (Year: 2020).*

(Continued)

*Primary Examiner* — Kaitlin S Joerger

(57) ABSTRACT

Disclosed is an assembly line for processing products. The line includes, on one hand, a plurality of consecutive stations for processing the products and, on the other hand, a moving unit for moving the products between the stations within the line, in particular from an upstream station in which the products have just been processed, to a downstream station in which the products must later be processed. The moving unit essentially includes at least one self-contained, self-supported, movable carriage moving on the ground and having the products resting thereon during the movement thereof within the line. Also disclosed is a corresponding implementation method and to a corresponding use of the carriages.

20 Claims, 3 Drawing Sheets

Figure 1:
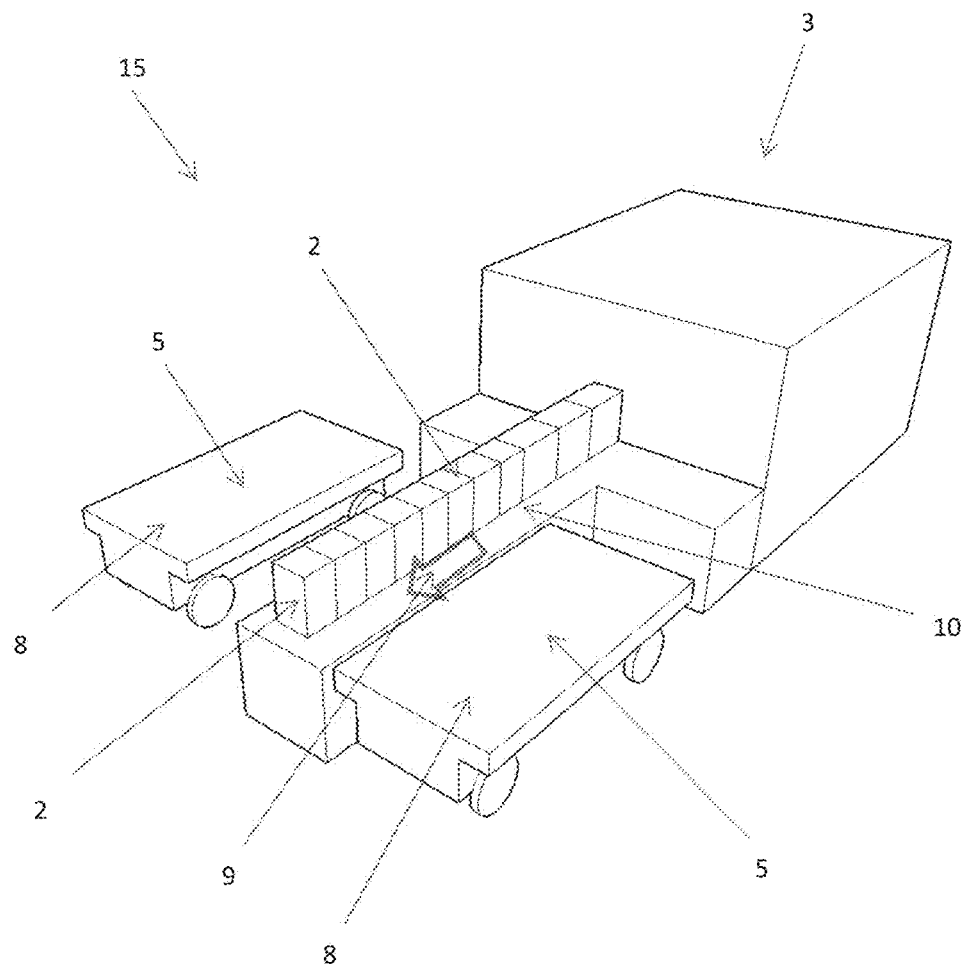

(51) Int. Cl.
    *B23P 21/00*     (2006.01)
    *B65B 11/58*     (2006.01)
    *B65B 3/00*     (2006.01)
    *B65B 35/44*     (2006.01)

(52) U.S. Cl.
    CPC ............ *B65B 11/585* (2013.01); *B65B 35/44* (2013.01); *G05D 2201/0216* (2013.01)

(56) References Cited

U.S. PATENT DOCUMENTS

| | | | |
|---|---|---|---|
| 4,993,507 | A | 2/1991 | Ohkura |
| 5,103,964 | A * | 4/1992 | Sticht .................... B23P 21/004 198/465.1 |
| 5,321,885 | A | 6/1994 | Hino et al. |
| 6,206,174 | B1 | 3/2001 | Koltz |
| 7,198,147 | B2 | 4/2007 | Petrovic |
| 8,220,615 | B2 | 7/2012 | Petrovic et al. |
| 9,102,022 | B2 * | 8/2015 | Shigemori ............ B23P 21/004 |
| 10,255,582 | B2 * | 4/2019 | Shydo, Jr. ............ G05D 1/0291 |
| 10,392,063 | B2 * | 8/2019 | Thorwarth ............ B62D 65/18 |
| 10,640,297 | B2 * | 5/2020 | Kilibarda ............ B65G 35/06 |
| 2002/0064440 | A1 * | 5/2002 | Ikeda .................... B23P 21/004 414/222.01 |
| 2012/0216384 | A1 * | 8/2012 | Immekus .............. B23P 21/004 29/428 |
| 2014/0365258 | A1 | 12/2014 | Vestal et al. |
| 2015/0316925 | A1 * | 11/2015 | Frisk ........................ B25J 9/162 700/113 |
| 2018/0004195 | A1 * | 1/2018 | Finke ............... G05B 19/41895 |
| 2018/0036845 | A1 * | 2/2018 | Thorwarth ........... B23P 21/004 |
| 2018/0250780 | A1 * | 9/2018 | Scholtz ................ B23Q 37/007 |
| 2019/0106283 | A1 * | 4/2019 | Yamaoka ................ B65B 35/16 |

FOREIGN PATENT DOCUMENTS

| | | |
|---|---|---|
| EP | 2 188 199 B1 | 12/2012 |
| FR | 2 998 282 A1 | 5/2014 |
| WO | 2013/083144 A1 | 6/2013 |

OTHER PUBLICATIONS

International Search Report issued in Application No. PCT/FR2016/050743, dated Jul. 13, 2016.

European Office Action issued in Application No. 16 163 587.5, dated Aug. 31, 2017.

* cited by examiner

DEVICE FOR CONVEYING VIA SELF-CONTAINED CARRIAGE

This invention pertains to the field of equipment for conveying within an industrial line for processing products, and it has as its object an assembly line for processing products, a particular carriage that is suitable for such a line, a particular use of a carriage, as well as a method for industrial processing of products.

In the field of the invention, a product processing line generally comprises an assembly of consecutive stations, which transform the product until the final production of a pallet that comprises a superposition of layers each comprising products, sometimes grouped into packs, boxes, bundles, etc., is achieved. Downstream from the line, the full pallet is then processed for shipping, optionally by being sent to a logistical management center, in particular of the automatic storage unit type. The product processing lines affected by the invention therefore produce at least a secondary packaging function, thanks to which the products are prepared for bulk shipping one at a time. The line can also have upstream functions, such as preparation, production, manufacturing, storage, of the product itself, upstream from such a secondary packaging for shipping purposes.

A large quantity of successive identical products is therefore processed in a similar way within successive stations of the line. The line therefore continuously performs overall the same processing with successive products at an overall rate that defines the yield of the line.

This type of line is therefore necessarily equipped with means for moving products between the stations. Conventionally, it is a matter of mechanical conveyors of the endless-belt type, able to rotate continuously and on which rest the products by their lower part to be driven by it between its two ends. Suitable accumulation solutions also make it possible to make a buffer between the successive stations.

A conveying solution for the processing line with one-at-a-time accumulation between two product processing stations is, for example, proposed in EP1497208 and is based on the succession of a module transforming a single-line flow into a multi-line flow, a module for accumulating such a multi-line flow, and then a module for transforming the multi-line flow into a single-line flow.

Another solution for movement between two processing stations one at a time is proposed in FR2998282 and is based essentially on a mechanical conveyance with an endless belt, a solution for transfer to a stationary accumulation table, to provide a transfer solution from said table to another mechanical endless-belt conveyor.

Other pieces of equipment for movement based on stationary mechanical conveyors are also proposed, for example, in EP2188199, or else in U.S. Pat. No. 6,206,174.

A shift in the use of such packaging lines toward smaller and smaller quantities of identical products is evident, however. The formats of processed products are therefore being forced to change more and more frequently, and the necessary changes and reconfigurations of the line are then themselves also more and more frequent. In addition, the change in format can require not only a new adjustment of the stations of the line, but also the substitution of certain stations of the line for others, compatible with the new processed product. This reconfiguration of the line in the area of the equipment that constitutes it is also brought about by the normal change of the line, to add thereto new machines, replace certain others, etc.

It is therefore increasingly important to be able to use a packaging line, upstream from the logistical installation for processing full pallets, which is the most flexible possible, capable of adapting very quickly to new formats of products and that it is also very easy to shift to new configurations.

For this purpose, the invention proposes substituting stationary mechanical conveyors by self-contained free-itinerary movable carriages, which then perform this function of moving the products between the machines within the line. The machines, or processing stations, can therefore be stationary and situated at different locations around the workshop, and even repositioned, even added, even eliminated, without having to reconsider the concept of stationary mechanical conveying solutions. Adding a processing station into the line then optionally requires only that it be input into the programming of carriages.

The invention thus has as its object an assembly line for processing products that comprises, on the one hand, a number of stations for successive processing of said products, and, on the other hand, a movement means for moving the products between the stations within this line. This line is characterized in that the movement means essentially consists of at least one self-contained, self-supported movable carriage that maneuvers on the ground and that transports the products during their movement within the line.

The invention also has as its object a carriage for such a line, as well as the use of self-contained, self-supported movable carriages as a movement means in an assembly line for processing products that comprises, on the one hand, a number of stations for successive processing of said products, and, on the other hand, a movement means for moving the products between the stations within this line, with said line performing a processing function for packaging products upstream from a storage unit for distributing pallets loaded with products that are packaged to be shipped.

Finally, the invention has as its objet a method implemented by such a line, namely a method for processing products within a line 1 for processing products that comprises a succession of stations and that performs at least one processing function for packaging upstream from a storage unit for managing units full of products to be shipped, of the pallet type, with said method comprising steps that consist essentially in, on the one hand, processing the products within successive stations, in particular processing them one at a time, and, on the other hand, moving, in the facility receiving the line, the products to a station for the purpose of processing and/or from a station after processing.

This method is characterized in that the movement of the products between the stations is done using at least one self-supported, self-contained movable carriage that transports a number of products, with the method comprising a step that consists in loading the movable carriage upon exiting from a station as well as a step that consists in unloading it upon entering a station.

Figure 2:
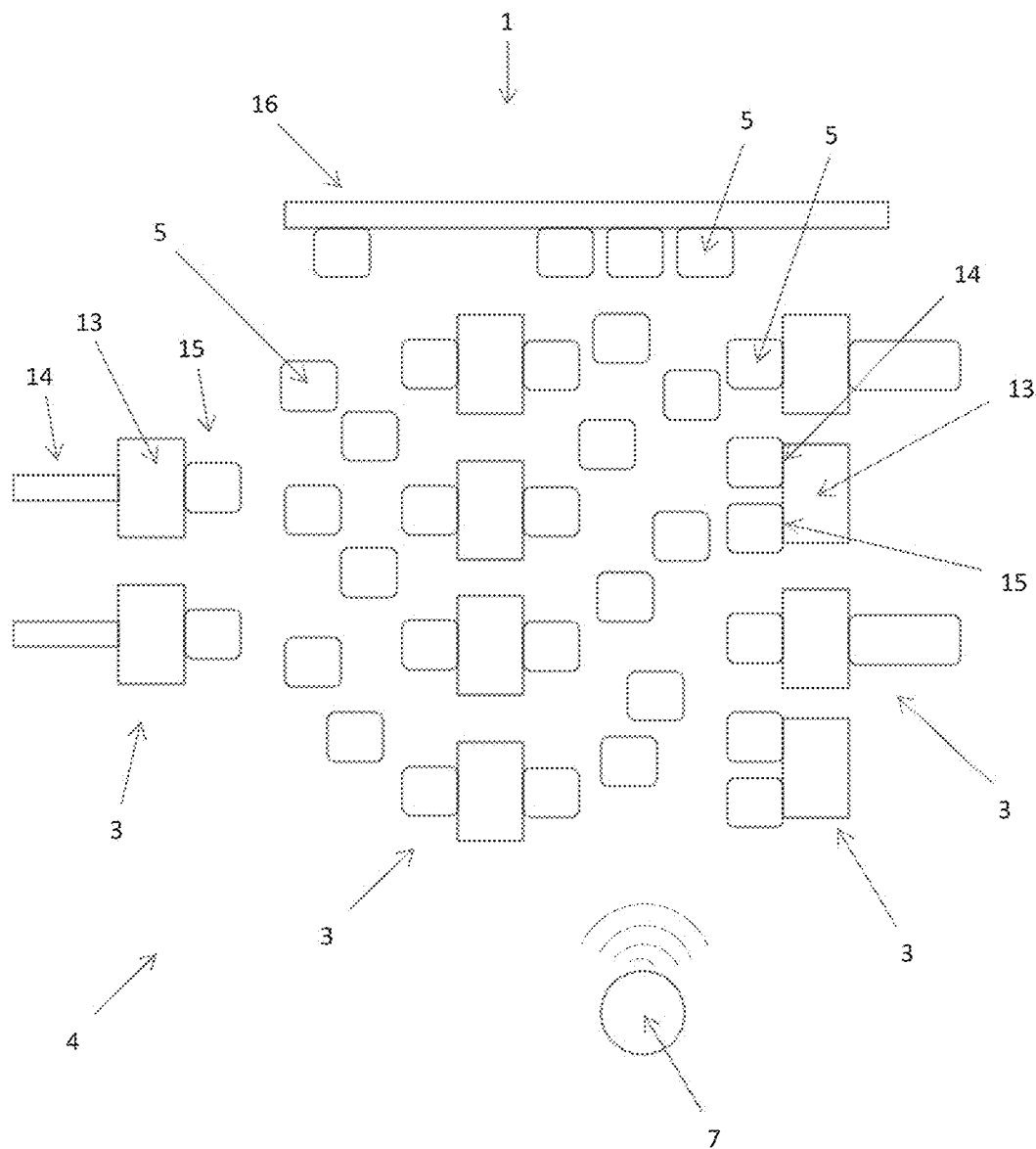
Figure 3:
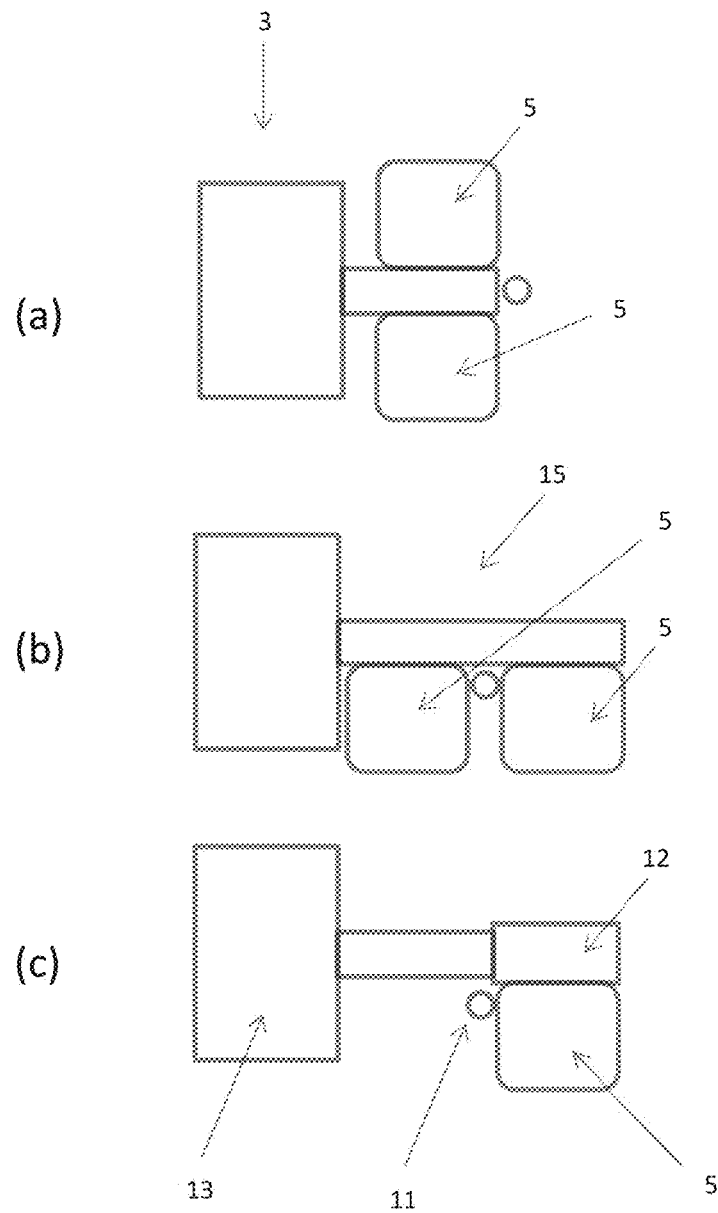

The invention will be better understood owing to the description below, which is based on possible embodiments, explained in a way that is illustrative and not at all limiting, with reference to the following accompanying figures:

FIG. 1 shows in diagram form a station for processing products one at a time, with a docked carriage and a carriage that approaches from the opposite side, FIG. 2 shows a line according to the invention, upstream from a logistical shipping center, and FIG. 3 shows in diagram form possibilities for exiting from a processing station in three configurations: 3*a*, 3*b* and 3*c*.

The invention thus first of all has as its object an assembly line 1 for processing products 2, comprising, on the one hand, a number of stations 3 for successive processing of said products 2, and, on the other hand, a movement means 4, for moving the products 2 between the stations 3 within this line 1, in particular from an upstream station 3 in which they have just been processed to a downstream station 3 in which they must later be processed.

The products 2 are in particular of the liquid container type, empty or full, food, case, box, carton, full or empty, etc.

The processing line 1 employed in using this type of movement means can be the complete installation that performs the complete processing from the manufacturing of the product 2 to its palletizing ready for its subsequent tracking at a logistical sorting center or for its shipping, or only a part of such an installation, in particular, for example, a block of stations 3 within such a complete installation for preparation for shipping. The expected flow rates within such a line 1 processing the products 2 one at a time are significantly higher than those, upstream or downstream, processing pallets, on which the number of products 2 is significantly different.

The processing stations 3 ensure in particular the transformation of products 2 one at a time, such as filling, labeling, or else of multiple products 2 of the container type simultaneously for grouping them in a pack, of multiple products 2 of the case type for organizing them in a layer on a pallet, etc. The successive stations 3 can thus carry out manufacturing, transformation, storage and/or else make a change to the geometric organization of the products 2. Of course, the line 1 has stations 3 that receive their products 2 from the outside, both as raw material for the line 1 as well as stations 3 that provide on the outside the products 2 at the end of processing via the line 1. The line 1 therefore participates in the preparation upstream of units for logistical shipping, generally based on pallets rather than on management, allocation and distribution of these units.

The line 1 is arranged in a suitable workshop or hall, and the stations 3 preferably rest on the ground. The movement means 4 that is conventionally used in the state of the art is based on conveyors with movable endless belts, mounted on a stationary structure that is put on the ground in the workshop. The operators of the line 1 move about in this workshop, and it is then necessary to provide in particular walkways for circumventing such movement means 4. The stations 3 are difficult to move and generally anchored to the ground.

According to the invention, the movement means 4 essentially consists of at least one self-contained, self-supported movable carriage 5 that maneuvers on the ground and that transports the products 2 during their movement within the line 1, preferably a fleet of such carriages 5 that can navigate between the stations 3 of the line 1. It is not necessary that the carriages 5 return to the pieces of equipment or other machines that are outside of the line 1, but they can be dedicated to the stations 3 of the line 1. The carriages 5 therefore connect the various stations 3 of the line 1 and ensure the circulation of the flow of products 2 within the line 1.

Using carriages 5 thus ensures maximum flexibility based on the number of products 2 to be processed with the defined format, but also based on stations 3 that are involved in the production of the defined format, etc.

It will be understood that these carriages 5 form vehicles or shuttles that are self-contained, capable of moving multiple products 2 between two successive stations 3 at the same time. The movement of these carriages 5 therefore creates the movement of the products 2 between the stations 3. The carriages 5 therefore move during the production via the line 1.

According to a possible additional characteristic, the at least one movable carriage 5 is equipped with an on-board drive, in such a way that said carriage 5 can itself generate its own movement, in particular in the form of a drive unit, a transmission, and a set of wheels. Said movable carriage 5 is thus self-guided and therefore has a free itinerary between the stations 3, independently of a mechanical guide structure of the rail or electromagnetic type such as a metal marker on the ground, etc., in such a way as to reach maximum flexibility in the path to be followed based on optionally movable elements from the environment that it is necessary to avoid, such as operators and even other carriages 5.

The movable carriage 5 has, on the one hand, a surface 8 for receiving products 2, on which surface the products 2 can rest by their lower part, and, on the other hand, a frame on which is mounted at least the on-board drive as well as said receiving surface 8. The receiving surface 8 is preferably horizontal, and may arrive at the level of the exit from the upstream station 3 and/or at the level of the entrance of the downstream station 3. The carriage 5 can be equipped with multiple superposed receiving surfaces 8.

For its interaction with the stations 3, the movable carriage 5 can also comprise in particular docking means that ensure mechanical interfacing and proper positioning with the station 3 where it receives the products 2 and/or the station 3 to which it delivers the products 2. These docking means can be in particular mechanical means for referenced positioning, for example by complementary parts such as cones.

In a general way, it can be considered that the interaction with a station 3, upstream or downstream, is done with multiple carriages 5 simultaneously. Thus, for example, multiple carriages 5 can agglomerate to form a single unit, which will receive the products 2 at a station 3 or that will deliver the products 2 to a station 3. During this step for transfer from or to a station 3, the carriages 5 are then held together to form a solid element, in particular owing to removable mutual attachment solutions. Once loaded or unloaded, totally or only partially, the carriages 5 can be separated each to move in a self-contained way, optionally toward various stations 3. Alternatively, the carriages 5 can remain together and continue to form a compact and integral unit, even during their movement in the production workshop.

In a general way, the carriages 5 therefore form modules that can be assembled mechanically to form a monolithic unit of greater storage capacity in terms of products 2. In a configuration where the carriages 5 are grouped, they are therefore attached to one another, and the group that they form moves in a self-contained way and defines its own trajectory. To ensure consistency, one of the carriages 5, for example, can become the master and the others can become slaves. The group of carriages 5 forms a queue of carriages 5.

The agglomerated or broken-up state of the carriages 5 can change or be preserved between the various primary steps:

Loading upon exiting from a station 3: in the form of carriages 5 that are agglomerated with one another, which preferably moves only once the entire surface is occupied, or in the form of carriages 5 fed one after the other, each filled carriage 5 emerging from the station 3;

Unloading upon entering a station 3: in the form of carriages 5 that are agglomerated with one another, which preferably only moves once the entire surface is emptied, or in the form of carriages 5 that are fed one after the other, each emptied carriage 5 emerging from the station 3;

Movement in the line 1 between the stations 3 to move the products 2: movement of each carriage 5 one after the other, movable one after the other, and independent, or movement in a block formed by multiple carriages 5 that are connected one behind the other.

The carriage 5 also optionally comprises an energy reserve for the operation of the on-board—in particular electric—drive, with at least one station 3 then being provided with an electrical power supply means for recharging the carriage 5 when it is docked in said station 3. It is understood that even in the case where multiple carriages 5 are grouped into an assembly, each of them remains self-contained, in which sense there is no need for the other carriages 5 to move in the case of separation. The grouping of multiple carriages 5, optionally temporary, therefore forms again a larger-capacity carriage 5; in other words, a carriage 5 can, if necessary, be considered as constituting multiple other smaller carriages 5.

According to another possible additional characteristic, the at least one carriage 5 is able itself to define its itinerary between its departure station 3 and its arrival station 3, by taking into account, in particular, the time allotted for the trip, obstacles to avoid, etc.

Said carriage 5 can be equipped in particular with a physical geolocation system, owing to which it knows instantaneously its own position in space, as well as optionally also means for detecting obstacles, in particular optical obstacles, and even also an on-board computing unit that defines the itinerary of said carriage 5, taking into account the departure station 3 and the arrival station 3. It thus is possible for the carriage 5 to adapt itself to its environment, which can change from one cycle to the next, and even during the cycle in the case of movable elements. The carriage 5 therefore has a cyclical operation where it recovers products 2 at one station 3 and delivers them to another station 3.

The line 1 comprises in particular a control center 7 that ensures the coordination of the movement of the carriages 5 between the stations 2, at least by controlling the departure and arrival stations 3 of each carriage 5, between which said carriage 5 can freely define its itinerary, and even also by defining at least partially certain elements of their travel.

According to another advantageous characteristic, the line 1 also comprises a receiving station 16 for temporarily receiving, during their trip between the stations 3, carriages 5, loaded or not with products 2, in such a way as thus to ensure an accumulation zone in the case of the impossibility for the destination station 3 of receiving the products 2 or the impossibility for the original station 3 of providing the products 2.

Said receiving station 16 also comprises in particular means for providing power to the carriages 5 that are found there, to make possible for them a recharging during their presence in the receiving station 16.

According to another possible additional characteristic, each station 3 is equipped with a transfer means for collecting the products 2 to be processed that are present on the carriages 5 and/or to deposit the processed products 2 on the carriages 5, in particular a transfer means that comprises a manipulator 11. This transfer means thus performs the movement of the products 2 between the receiving surface 8 and either the entry zone 14 or the exit zone 15. In a general way, this transfer means can be mounted on the carriages 5. Thus, in particular embodiments, the at least one carriage 5 is equipped with a transfer means for collecting the products 2 that are processed by an upstream station 3 and to move toward a downstream station 3, and/or to deposit the products 2—that are previously processed by an upstream station 3 and that it has moved—upon entering from a downstream station 3.

Said transfer means, mounted on a station 3 or a carriage 5, relies on, for example, a multi-axis robotic solution or a robotic solution with slides, optionally with complementary conveyance of the endless-belt type.

According to another possible additional characteristic, the stations 3 process the products 2 one at a time and are each equipped with a means for one-at-a-time feeding of the endless-belt-conveying type, as well as a means for one-at-a-time extraction of the endless-belt-conveying type, with the carriages 5 performing the movement of a batch of similar products 2 each time between the stations 3. These conveyances are respectively located in the entry zone 14 and the exit zone 15. It is understood that any configuration is conceivable: the carriages 5 can, on the one hand, receive batches of products 2 that form segments of a single column or of multiple columns, and, on the other hand, provide batches of products 2 that form segments of a single column or of multiple columns. The station 3 can be equipped with a solution for transforming the flow, for converting the single-line flow into a multi-line flow, or vice versa.

It can thus be particularly advantageous to receive, in the exit zone 15 of a station 3, the products 2 in a single-line column cut successively in batches to be processed and to be accumulated transversely on the carriage 5, and then, for the unloading, in the entry zone 14 of the downstream station 3, to move multiple such batches simultaneously from the carriage 5. Owing to the principle of transfer on the carriage 5, which is based on a transverse transfer of successive portions of a single-line flow, the products 2 are therefore stored on the carriage 5 in a non-staggered matrix and can then be provided at the downstream station 3 with such an organization.

The invention also has as its object a carriage 5 that comprises, by themselves or in combination, the characteristics that are described above and that are necessary for making possible the embodiment of such a line 1. In possible embodiments of this carriage 5, it has a surface 8 for receiving products 2 on which said products can rest upright, with said receiving surface 8 having an essentially rectangular shape, with the processed products 2 being fed on one side of said surface and brought out from the opposite side and accumulated in adjacent rows between these sides, in such a way as to ensure that the first product that has entered is the first product that exits.

The invention also has as its object a method for processing products 2 within a line 1 for processing products 2 that comprises a succession of stations 3 and that performs at least one function for processing of packaging upstream from a storage unit for managing units full of products 2 to be shipped, of the pallet type, with said method comprising steps that consist essentially in, on the one hand, processing the products 2 within successive stations 3, in particular processing them one at a time, and, on the other hand, moving, in the facility receiving the line 1, the products 2 to a station 3 for the purpose of processing and/or from a station 3 after processing. The processing can be storage, organization, or else transformation, etc.

According to the invention, the movement of the products 2 between the stations 3 is done using at least one self-supported, self-contained movable carriage 5 that transports a number of products 2, with the method comprising a step that consists in loading the movable carriage 5 upon exiting from a station 3 as well as a step that consists in unloading it upon entering a station 3.

The movement of the products 2 within the line 1 is therefore carried out by the carriage 5 on which the products 2 are located, as a replacement of a conveying solution with a stationary structure.

The stations 3 perform in particular a processing of products 2 one at a time, with said products 2 exiting from and/or entering said station 3 preferably in a column, and the operation for loading the carriage 5 then consisting in particular in moving onto the carriage 5 at least one segment of said column upon exiting, the unloading operation then consisting in particular in moving the products 2 so that they form successively segments of said column upon entering, and even segments of a feed in multiple columns, with the carriage 5 being able to receive a number of such segments placed beside one another.

In the particular embodiment illustrated in the accompanying figures, the processing line 1 comprises a number of stations 3 in which the products 2 are successively processed. The products 2 are preferably liquid containers that are processed one at a time, before or after filling, or else groups of such containers. Such processing can be, for example, cleaning an empty container, filling, labeling, crating, etc. The first station 3 is, for example, a piece of equipment of the depalletizing type, which receives pallets full of products to be recycled, and which puts out products 2 one at a time that are ready to continue in the process of filling and packaging for the purpose of shipping. Downstream, the last station 3 can be a piece of equipment of the palletizing type, which receives the products 2 that are containers grouped into packs, cases, bundles, etc., and which puts out pallets full of superposed layers that each comprise multiple such packs. A station 3 can also be a temporary stock where the products 2 are accumulated in one form or another.

The line 1 that is the object of the invention preferably performs at least one of the following functions:

The production of containers that are ready to be filled with liquid, in particular a depalletizing, an uncrating, cleaning, sorting, manufacturing, orientation, selection, etc.;

The production of independent containers that are ready for use, in particular filling, labeling, sealing, etc.;

The production of elements that are ready for purchase by the final user, such as packs, bundles, cases, boxes, etc., with functions of grouping, crating, bundling, etc.;

The production of a block that is ready for shipping, via a logistical center, in particular a unit or pallet made of superposed layers, with functions of composition and organization of packs or cases in layers, as well as superposition of layers over one another and then coating by elastic film.

It is understood that in each of these functions, the line 1 processes the products 2, whether this is one at a time or in a group. The line 1 is therefore not concerned by the subsequent processing of palletized blocks that are ready for shipping but contributes to the preliminary production of such blocks that are ready for shipping, by processing products 2 in the broad sense: individual container or group of containers in a pack or bundle. The line 1 therefore performs functions of preliminary preparation of palletized units to be shipped physically into other facilities, by truck, boat, etc.

For the various processing stations 3 whose possible functions were listed above, the products 2 are therefore generally fed upon entering successively, one at a time or in a group, and are then recovered upon exiting. It is therefore necessary to bring the products 2 between the various stations 3 of the line 1. The invention then proposes, rather than using cumbersome and rigid mechanical conveyors, to collect the products 2 upon exiting from a station 3 on a movable carriage 5 that itself will move to the entrance of the next station 3 and will thus perform, by its self-contained movement, the displacement of products 2 within the line 1.

In the example of FIG. 1, the products 2 exit from the processing station 3 in a single-line column into the exit zone 15. The station 3 can be a labeler, a dryer, etc. Upon exiting from the station 3, the products 2 travel in a column that is oriented in a conveying direction 9, owing to, for example, an exit conveyor 10 that puts out the products 2 exiting from the station 3, of the endless-belt-conveyor type, on the upper surface of which the products 2 rest.

The successive products 2 are then moved toward a carriage 5 that is placed beside the exit from the station 3. The products 2 are then transferred owing to a movement that is essentially perpendicular to the conveying direction 9. The carriage 5 then has an upper receiving surface 8 on which the products 2—upon exiting from the station 3—are received. It will be noted that in an advantageous way, a number of successive products 2 are simultaneously moved transversely over the receiving surface 8 of the carriage 5. The receiving surface 8 of the carriage 5 is therefore preferably at the same level as the exit conveyor 10, and it is then necessary only to push the batch of products 2 horizontally from the exit conveyor 10 to the receiving surface 8. This operation for transverse horizontal transfer of a batch can be done with a manipulator 11 that grips the products 2, of the bottle type, by their upper part, or neck, or else by a simple pusher that then acts on the bodies of the products 2 at the exit zone 15. The advantage of working on the body and even the bottom of the product 2 rather than on its upper part is a greater versatility as regards various possible formats. An equivalent arrangement can be provided in the entry zone 14 of the station 3.

According to the respective location of its entry zone 14 and its exit zone 15, a station 3 can then—to load on the carriages 5 the products 2 that it puts out upon its exit, or else to load upon entering the products 2 that it is to process—be equipped with a manipulator 2 that can perform one and even two functions, and even multiple manipulators 2, optionally one for each function. It will be understood that in possible embodiments, the manipulator 11 can be carried on board the carriage 5 itself, such as at least one pusher, a controlled arm, or else a movable belt on which the products 2 rest.

The products 2 are therefore transferred to the carriage 5 in the form of a batch or a compact unit with the products 2 behind one another, in accordance with the exiting from the station 3. Each batch on the carriage 5 can push transversely the preceding batch or, alternatively, the carriage 5 can be equipped with its own belt that performs the movement of the successive batches, transversely to the conveying direction 9.

The single-line column of products 2 upon exiting from the station 3 is therefore cut in a succession of batches of products 2 that are then stored side by side on the receiving surface 8 of the carriage 5, transversely to the conveying direction 9.

This principle is, of course, perfectly adaptable to an exit in the form of multiple columns of parallel products 2 or a multi-line exit. The products 2 can thus be transferred to the carriage 5 by batches that are each formed by multiple rows of products 2 side by side that each extend in the conveying direction 9.

The products 2 are therefore placed on the carriage 5 in the area of its upper surface forming a receiving surface 8, in a matrix and non-staggered: the products 2 of two rows side by side are located in the same area rather than each interlocked between two products 2 of the next row. During the unloading of the carriage 5 at the next station 3, it is thus possible to unload again each successive segment and even to unload multiple segments simultaneously. It will be noted that this method of conveying between two stations 3 makes it possible to avoid the problems that are associated with switching from an organized flow in staggered rows to a flow organized in a matrix or in parallel corridors, and even in a single corridor, and vice versa.

The carriage 5 therefore also forms an accumulation means on which the products 2 upon exiting from the station 3 are stored temporarily. The accumulation capacity of the carriage 5, which forms a self-contained movable accumulator, depends, of course, in particular on the time that is necessary for connecting the downstream station 3, the respective processing speeds, the travel speed of the carriage 5, etc.

The course of the processing of the products 2 via the line 1 therefore comprises a docking phase by an empty carriage 5 upon exiting from the station 3, as well as a subsequent detachment phase by the at least partially filled carriage 5. The equivalent docking steps of the entry zone 14 of a station 3 by a carriage 5 that is at least partially full as well as the detachment of the empty carriage 5 take place in the area of the downstream station 3, where the products 2 have been brought.

These docking and detachment periods preferably should not disrupt the continuous operation of the upstream station 3 and/or the downstream station 3. A station 3 that is to provide products 2 at a portion of the downstream line 1 then has a docking zone for the carriage 5 in its exit zone 15. A station 3 that is to receive products 2 from upstream from the line 1 has at its entrance a docking zone for a carriage 5. A station 3 can, of course, combine the two. FIG. 3 thus shows possible structures more particularly for the exit zone 15, but that are perfectly adaptable for the entry zone 14.

In FIG. 3a, the exit zone 15 of the station 3 has an exit conveyor 10, with a docking zone for a carriage 5 on each side. The manipulator 11 that transfers the products 2 from the exit conveyor 10 to the carriages 5 is then positioned in such a way as to be able to perform the transfer of the products 2 from two sides, for example in the extension of the exit conveyor 10. Thus, the docking of a carriage 5 can take place while the other carriage 5 is in the process of being filled. When this last carriage 5 is complete, it is then necessary only to change the operation of the manipulator 11 in such a way that it brings the products 2 to the other carriage 5. The detachment of the previously filled carriage 5 is then done during the loading of the new carriage 5, and so on. The station 3 can then work continuously, and the products 2 that it puts out can be conveyed to the downstream station 3 intermittently using carriages 5 that are successively docked, filled, and then detached. The embodiment that is illustrated in FIG. 1 shows such a possibility of having a distribution of the products 2 on the one side, and then the exit conveyor 10 on the other.

In FIG. 3b, an alternative is illustrated, according to which the exit conveyor 10 has docking zones one after the other, on the same side of the exit conveyor 10. The manipulator 11 then transfers the products 2 successively, either toward one carriage 5 or toward the other, and the docking and detachment of the one is done during the filling of the other.

In FIG. 3c, another solution is proposed, based on a buffer 12 exiting from the processing station 3. This buffer 12 makes it possible in particular to accumulate the products 2 over the time that is necessary for the docking and/or the detachment of a carriage 5. Taking into account the necessity, in high-speed applications, of halting the movement of the products 2 in the conveying direction 9, this buffer 12 can also be used to halt the products 2 on one track while another track is being used to monitor the continuous speed of the station 3, etc. This buffer 12 can then take the form of a transverse accumulation of batches of products 2 that will then be moved transversely to the carriage 5. It will be noted that this buffer 12 can comprise all of the products 2 that are simultaneously brought to the receiving surface 8 in a single cycle of the manipulator 11. In addition, the unloading of the products 2 upon entering the downstream station 3 can also consist in moving simultaneously all of the products 2 that are present on the receiving surface 8 of the carriage 5.

The carriage 5 can thus be used, for example, to receive multiple parallel columns of non-interlocked products 2 from the upstream station 3 simultaneously and then to deliver them again simultaneously to the downstream station 3.

The station 3, in the particular cases where this is a station that transforms the products 2 rather than a simple storage unit, comprises a processing zone 13 between an entry zone 14 and an exit zone 15 where the portions for the carriage docking 5 are found. The station 3 is preferably equipped, in at least one of these zones, with a conveying solution that brings the products 2 from the entry zone 14 to the processing zone 13 and/or from the processing zone 13 to the exit zone 15. The products therefore travel in a conveying solution, preferably of the endless-belt type, between the processing zone 13 and the carriages 5, upstream and/or downstream. The same belt can, for example, perform the movement through the three zones.

In addition, for low-speed applications, it is also conceivable that the manipulator 11 perform a tracking of the movement of the products 2 that travel on the exit conveyor 10. The manipulator 11 can, for example, take the form of a robot that is equipped with a tool on its end, with the latter able to move at the travel speed of the products 2 or at least of the entry or exit conveyor that performs the movement thereof, in such a way that it is not necessary to stop the longitudinal travel of the products 2. The tool then moves at the same speed as the products 2 and can grip them by batch without it being necessary, for example, to stop the exit conveyor 10. This tracking of the travel speed can be applied to the entry zone 14 for exiting after the processing zone 13 but also before the processing zone 13 for feeding the products 2.

Of course, these configurations can be combined.

In an advantageous way, the products 2 are transferred by batch, with a movement that is essentially horizontal and perpendicular to the direction in which the at least one column that forms said batch extends, i.e., the conveying direction 9. This loading and unloading movement is then parallel to the conveying plane. The batches are then successively accumulated transversely to said conveying direction 9. The unloading is preferably done from the side opposite to the one where the loading of the products 2 on the receiving surface 8 of the carriage 5 is done, which makes it possible to ensure in particular that the first products 2 that enter the carriage 5 are also the first that leave it: first in, first out.

In a preferred configuration, the receiving surface 8 of the carriage 5 is therefore essentially rectangular in shape, and the products 2 are fed to the carriage 5 along the side of said surface that comes against the exit conveyor 10 and is therefore parallel to it and to the conveying direction 9. The products 2 are then unloaded preferably by a side that is also parallel to it, in particular the opposite side. The products 2 taken from the carriage 5 to feed the downstream station 3 are thus arranged by batch, extending in the direction of movement of products 2 entering said station. The side of the carriage 5 where the products 2 are fed is therefore parallel to the conveying direction 9 of the products 2 exiting from the upstream station 3, whereas the side of the carriage 5 where the products 2 are unloaded to feed the downstream station 3 is parallel to the entry conveyance from said station. In other embodiments, the loading and the unloading can be done along the sides of the carriage 5 that are not parallel to one another but are, for example, perpendicular to one another.

As has already been said, the loading and/or the unloading of the carriage 5 can be done each time with a batch of products 3 that extends into one and even multiple columns of products 2, parallel to the upstream and downstream conveying direction.

FIG. 2 shows an application in which some of the stations 3 can have their exits in the extension of their entrances and some others have their exit and their entrance side by side.

The invention thus proposes to have a conveying solution between the stations 3 that have a free itinerary rather than a fixed itinerary. Fixed-itinerary conveying solutions are, for example, a mechanical endless-belt conveyance on a stationary support, shuttles traveling on stationary rails and able to contain one or more products 2, movable blocks between the stations 3 and guided in an unchangeable way by rails on the ground, for example. The carriages 5 that are used in the invention, beyond the fact of transporting the products 2 by working with their lower part, have a free itinerary, which can be adjusted, for example, based on optionally movable obstacles in the workshop where the line 1 is found. Their itinerary can also be changed by modifying the definition of the stations 3 between which they are to move the products 2, which can be done, for example, as soon as a station 3 is overloaded or short, and even as soon as another station 3 requires more loading or unloading flow on an instantaneous basis. The fact of having a free itinerary therefore ensures a very great flexibility even when the line 1 is in operation for processing only a single format of products 2. It will be understood, of course, that this also makes possible a very great flexibility from one format of product 2 to the other, since it is very easy to use the same fleet of carriages 5 for productions that require groups of stations 3 that are different each time, optionally located at other locations for at least some of them. In addition, in the event of a technical problem or need for maintenance on a station 3, it is also very easy to divert the products 3 that were intended for it or also to supply the products 2 that it was supposed to provide. A need for extra production on an instantaneous basis can also be very easily met, since it is necessary only to add one or more stations 3 to the group of stations 3 between which the carriages 5 travel.

The information from the station 3 as to where the products 2 are to be removed as well as the information from the station 3 as to where the products 2 are to be delivered next can be enough to ensure that the carriage 5, equipped with its own smart control unit, then defines its path on the ground in the workshop where the line 1 is located. Preferably, the line 1 is equipped with a control center 7 that communicates, in particular wirelessly, with each of the carriages 5, to send instructions regarding departure, destination, and/or path, etc., in order, in a general way, to coordinate the behavior of the fleet of carriages 5.

Advantageously also, as FIG. 2 shows, the line 1 can be equipped with a receiving station 16 for the carriage 5. This receiving station can preferably receive at least one carriage 5, full, empty or partially full, for the purpose of performing an accumulation function between the stations 3 to accumulate products 2 before unloading or accumulating on the conveyance surface before loading, etc. This station can also be used for power recharging, in the preferred case where the carriage 5 carries on board an electric-battery-type energy reserve. If an upstream station 3 delivers an excess of products 2 in relation to the instantaneous capacity of the downstream stations 3, the full carriages 5 can then be on standby in the receiving station 16, which thus represents an accumulation means between stations 3 that is suitable for conveying by carriage 5. In the same way, if a downstream station 3 consumes an excess of products 2 relative to the instantaneous production capacity of the upstream station 3, the empty carriages 5 can be on standby in the receiving station 16.

During the operation of the line 1, each carriage 1 is preferably assigned, on the one hand, to an upstream block comprising at least one station 3, and, on the other hand, to a downstream block comprising at least one station 3. Each carriage 5 then preferably takes the products 2 to an upstream station 3, deposits them at a downstream station 3, and returns to the upstream station for the next cycle. It will be noted, however, that the fact of receiving the products 2 by their lower base part resting against the receiving surface 8 of the carriage 5 also ensures the versatility of the carriage 5, which is then able to convey any type of products 2: bottle-type container of any form, pack, case, etc. A carriage 5 can therefore be used temporarily in a bi-directional connection between another pair of stations 3. In addition, a carriage 5 can leave a station 3 only partially loaded and then join the output from at least one other station 3 to receive therein other types of products 2 and then to deliver, for example, multiple types of different products 2 to a downstream station 3 simultaneously, and even successively deliver to multiple stations 3 the products 2 that are intended for them. A carriage 5 can also be used in the travel between multiple stations 3 and not simply round trips between two stations 3.

To ensure that the carriages 5 move independently, in addition to the control center 7 for coordination and/or the on-board guidance unit, the carriage 5 comprises a drive unit as well as the corresponding power source, if necessary. The carriage 5 preferably comprises a frame for receiving all of these elements, as well as the receiving surface 8. Mobility can be ensured by a rotary engine and wheel, or else by a magnetic linear motor working with a suitable pavement, or any other form of actuator. Preferably, the carriage 5 carries on board an electric motor, wheels that it drives, as well as a rechargeable electric battery. This electric battery can then be recharged when the carriage 5 is docked at a station 3, for loading or unloading, or else when the carriage 5 is in the receiving station 16. This recharging can be done by suitable connectors between the carriage 5 and the receiving station 16 and/or the station 3, or in a contactless manner by a magnetic terminal embedded in the ground.

It will be understood that this principle of conveying by the self-contained and self-supported carriage 5 can be applied within a line 1 that only comprises stations 3 that each perform a transformation of the products 2 but that also comprises stations 3 where the products 2 are simply stored, optionally temporarily, after an unloading of the carriages 5 that feed it, or else before a loading of the carriages 5 that it feeds. The products 2 can then be stored in such a station 3 as semi-finished products 2, for example on stand-by for further processing, without the carriage 5 having to be locked as in a receiving station 16.

The processed products 2 are preferably containers, such as bottles or flasks, empty or full, and even groups of such containers, such as cases, boxes, or else bundles, comprising multiple container-type products 2.

The invention is particularly applicable in the case of lines where the stations 3 are each equipped with at least one entry conveyor for receiving, continuously, products 2 to be processed, and/or least one exit conveyor 10 for delivering processed products 2 continuously. Such a line normally processes the products 2 in an uninterrupted flow. The carriages 5 then recover products 2 from an exit conveyor 10 that puts them out continuously. They can also provide products 3 to an entry conveyor that then feeds the station 3 continuously. The stations 10 therefore operate continuously and process products 2 in a continuous way. The cycle for processing by the stations 3 and the cycle for movement by the carriages 5 are without interaction.

In such a line, unlike the line where the products are not conveyed and/or processed continuously, the fluidity and the continuity of the processing are essential and then ensured by the fact that the movement means 4 can receive products 2 without interrupting the exit conveyor that feeds it and delivers continuously and can deliver products 2 on an entry conveyor without having to stop it. To be compatible with such a continuous flow from the stations 10, the carriages 5 preferably convey the products 2 that are arranged on them in a configuration in the form of a single rectangular layer that comprises multiple products 2, with said layer being loaded and then unloaded by longitudinal segments that together form a continuous flow. The carriage 5 therefore conveys a number of products 2 organized into a single layer in which the products 2 are in a matrix, beside one another. The products 2 can rest directly or not on the carriage 3.

Thus, preferably, in the invention, the line in question comprises, on the one hand, a number of stations 3 for successive processing of said products 2, and, on the other hand, a movement means 4, for moving the products 2 between the stations 3 within this line 1, namely from upstream stations 3 that each have an exit conveyor 10 on which the processed products 2 are delivered continuously in the form of a column of one or more products 2 of width for a loading of the movement means 4, toward downstream stations 3 that each have an entry conveyor for an unloading of the movement means 4, on which the products 2 are received in a column of one or more products 2 of width.

The exit conveyor 10 therefore delivers the products 2 in a continuous flow.

Overall, thanks to the invention, it is thus possible to obtain, upstream from a logistical center for shipping finished assemblies, a line 1 for processing products 2 that is extremely versatile and flexible, where the modification of the processing stations 3 is done very easily, without it being necessary either to redesign or retrofit stationary conveyors and corresponding infrastructure: electrical power to associated motors, travel walkways, etc.

Although the description above is based on particular embodiments, it is in no way limiting of the scope of the invention, and modifications can be provided, in particular by substitution of equivalent techniques or by a different combination of all or part of the characteristics developed above.

The invention claimed is:

1. Assembly line (1) for processing products (2), comprising
   a plurality of stations (3) for successive processing of said products (2), each station (3) having an entry zone (14) for entry of product (2) and an exit zone (16) for removal of product (2) from the station (3), the entry zone (14) and exit zone (16) being approximately parallel to one another and on the same plane as one another,
   a movement means (4), for moving the products (2) between the stations (3) within the line (1) from an upstream station (3) to a downstream station (3), comprising at least one self-contained, self-supported movable carriage (5) that maneuvers on the ground having a free itinerary and that transports the products (2) during their movement within the line (1), wherein the upstream station (3) comprising as output an output conveyor (10) that continuously puts out the products (2) into one or more columns, and
   a transfer means comprising a manipulator (11) configured to dynamically collect products (2) from and deposit products (2) to the carriage (5) positioned at the entry zone (14) or the exit zone (15).

2. Processing line (1) according to claim 1, wherein the at least one movable carriage (5) is equipped with an on-board drive, in such a way that said carriage (5) can itself generate its own movement.

3. Processing line (1) according to claim 1, wherein the at least one carriage (5) is able itself to define its itinerary between its departure station (3) and its arrival station (3), by taking into account the time assigned for the trip and/or obstacles to avoid.

4. Processing line (1) according to claim 1, further comprising a receiving station (16) for temporarily receiving, during their trip between the stations (3), carriages (5) that may or may not be loaded with products (2).

5. Processing line (1) according to claim 1, wherein each station (3) is equipped with a transfer means for collecting the products (2) to be processed that are present on the carriages (5) and/or for depositing the processed products (2) on the carriages (5).

6. Processing line (1) according to claim 1, wherein the manipulator collects the processed products (2) by an upstream station (3) and moves toward a downstream station (3), and/or to deposits the products (2), previously processed by an upstream station (3) that has moved, upon entering from a downstream station (3).

7. Processing line (1) according to claim 1, wherein the stations (3) process the products (2) one at a time and are each equipped with a means for one-at-a-time feeding of the endless-belt-conveying type, as well as a means for one-at-a-time extraction of the endless-belt-conveying type, with the carriages (5) performing the movement of a batch of similar products (2) each time between the stations (3).

8. Carriage (5) for a processing line (1) according to claim 1.

9. Carriage (5) according to claim 8, wherein the carriage has a surface (8) for receiving products (2) on which the carriage can rest upright.

10. An assembly line (1) for processing products (2) comprising:
a plurality of stations (3) for successive processing of said products (2), each station (3) having an entry zone (14) for entry of product (2) and an exit zone (16) for removal of product (2) from the station (3), the entry zone (14) and exit zone (16) being approximately parallel to one another and on the same plane as one another,
a movement means (4) for moving the products (2) between the stations (3) within the line (1) from an upstream station (3) to a downstream station (3), with said line (1) performing a processing function for packaging products (2) upstream from a storage unit for distributing pallets loaded with products (2) that are packaged to be shipped, wherein the movement means comprises self-contained, self-supported movable carriages having a free itinerary, wherein the upstream station (3) comprising as output an output conveyor (10) that continuously puts out the products (2) into one or more columns, and
a transfer means comprising a manipulator (11) configured to dynamically collect products (2) from and deposit products (2) to the carriage (5) positioned at the entry zone (14) or the exit zone (15).

11. Method for processing products (2) within a line (1) that comprises a succession of stations (3), each station (3) having an entry zone (14) for entry of product (2) and an exit zone (16) for removal of product (2) from the station (3) and that performs at least one processing function for packaging upstream from a storage unit for managing units full of products (2) to be shipped, of the pallet type, with said method comprising:
processing the products (2) within successive stations (3) one at a time, wherein the entry zone (14) and exit zone (16) of each station is approximately parallel to one another and on the same plane as one another,
moving, in the facility receiving the line (1), the products (2) to a station (3) for the purpose of processing and/or from a station (3) after processing, wherein the movement of the products (2) between the stations (3) is in a direction from an upstream station (3) to a downstream station (3) and is done using at least one self-supported, self-contained movable carriage (5) having a free itinerary that transports a number of products (2), wherein the upstream station (3) comprises as output an output conveyor (10) that continuously puts out the products (2) into one or more columns, and
loading the movable carriage (5) using a first manipulator (11) configured to dynamically collect products (2) exiting from a first station (3), and
unloading the movable carriage (5) using a second manipulator (11) configured to dynamically deposit products (2) upon entering a second station (3).

12. Processing line (1) according to claim 2, wherein the at least one carriage (5) is able itself to define its itinerary between its departure station (3) and its arrival station (3), by taking into account, in particular, the time assigned for the trip and/or obstacles to avoid.

13. Processing line (1) according to claim 2, further comprising a receiving station (16) for temporarily receiving, during their trip between the stations (3), carriages (5) that may or may not be loaded with products (2).

14. Processing line (1) according to claim 3, further comprising a receiving station (16) for temporarily receiving, during their trip between the stations (3), carriages (5) that may or may not be loaded with products (2).

15. Processing line (1) according to claim 2, wherein the manipulator collects the products (2) to be processed that are present on the carriages (5) and/or for depositing the processed products (2) on the carriages (5).

16. Processing line (1) according to claim 3, wherein the manipulator collects the products (2) to be processed that are present on the carriages (5) and/or for depositing the processed products (2) on the carriages (5).

17. Processing line (1) according to claim 4, wherein the manipulator collects the products (2) to be processed that are present on the carriages (5) and/or for depositing the processed products (2) on the carriages (5).

18. Processing line (1) according to claim 2, wherein the manipulator collects the processed products (2) by an upstream station (3) and to move toward a downstream station (3), and/or to deposit the products (2), previously processed by an upstream station (3) that has moved, upon entering from a downstream station (3).

19. Processing line (1) according to claim 3, wherein the manipulator collects the processed products (2) by an upstream station (3) and to move toward a downstream station (3), and/or to deposit the products (2), previously processed by an upstream station (3) that has moved, upon entering from a downstream station (3).

20. Processing line (1) according to claim 4, wherein the manipulator collects the processed products (2) by an upstream station (3) and to move toward a downstream station (3), and/or to deposit the products (2), previously processed by an upstream station (3) that has moved, upon entering from a downstream station (3).

* * * * *